(12) United States Patent
Satapathy

(10) Patent No.: US 7,412,392 B1
(45) Date of Patent: Aug. 12, 2008

(54) CONFERENCE MULTI-TASKING SYSTEM AND METHOD

(75) Inventor: Durga P. Satapathy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 749 days.

(21) Appl. No.: 10/413,345

(22) Filed: Apr. 14, 2003

(51) Int. Cl.
*G10L 15/04* (2006.01)
*G10L 11/00* (2006.01)
*G10L 21/00* (2006.01)
*H04L 12/16* (2006.01)
*H04Q 11/00* (2006.01)

(52) U.S. Cl. ............... 704/270.1; 704/251; 370/260; 370/264

(58) Field of Classification Search .............. 348/14.08; 704/270.1, 251
See application file for complete search history.

(56) References Cited

U.S. PATENT DOCUMENTS

| | | | |
|---|---|---|---|
| 4,285,049 A * | 8/1981 | Bird et al. ............... 711/156 |
| 4,914,704 A | 4/1990 | Cole et al. |
| 5,627,936 A * | 5/1997 | Prasad et al. ............... 386/96 |
| 5,715,469 A | 2/1998 | Arning |
| 5,752,227 A | 5/1998 | Lyberg |
| 5,774,859 A * | 6/1998 | Houser et al. ............... 704/275 |
| 5,819,260 A * | 10/1998 | Lu et al. ............... 707/3 |
| 5,909,667 A | 6/1999 | Leontiades et al. |
| 5,946,386 A * | 8/1999 | Rogers et al. ............... 379/265.09 |
| 5,956,681 A | 9/1999 | Yamakita |
| 5,960,399 A * | 9/1999 | Barclay et al. ............... 704/270.1 |
| 6,028,626 A * | 2/2000 | Aviv ............... 348/152 |
| 6,134,223 A * | 10/2000 | Burke et al. ............... 370/265 |
| 6,173,259 B1 | 1/2001 | Bijl et al. |
| 6,212,497 B1 | 4/2001 | Araki et al. |
| 6,286,033 B1 | 9/2001 | Kishinsky et al. |
| 6,332,122 B1 | 12/2001 | Ortega et al. |
| 6,338,035 B1 | 1/2002 | Mori |
| 6,490,561 B1 | 12/2002 | Wilson et al. |
| 6,665,640 B1 * | 12/2003 | Bennett et al. ............... 704/257 |
| 6,693,663 B1 * | 2/2004 | Harris ............... 348/14.08 |
| 6,757,362 B1 * | 6/2004 | Cooper et al. ............... 379/88.01 |
| 2002/0161579 A1 * | 10/2002 | Saindon et al. ............... 704/235 |

* cited by examiner

*Primary Examiner*—David R. Hudspeth
*Assistant Examiner*—Justin W Rider

(57) ABSTRACT

A system that can receive information from a plurality of simultaneous remote conferences and scan the information for a key indicia. Upon determining that a key indicia is present in the information, the system is operative to alert a user.

21 Claims, 5 Drawing Sheets

CONFERENCE MULTI-TASKING SYSTEM AND METHOD

BACKGROUND OF INVENTION

This invention relates in general to remote conferencing and in particular to a system and a method for simultaneous monitoring of multiple remote conferences with a capability to alert the user to the occurrence of a pertinent discussion.

Remote conferring is increasingly being utilized to improve communication between physically separated sites while reducing time loss and costs associated with travel between the sites. Eliminating travel time also increases employee productivity while eliminating travel arrangement uncertainties. Such remote conferences may be as simple as a teleconference between several participants that utilizes conventional telephones. It is common for such teleconferences to involve multiple locations with speaker equipped telephones allowing access to the conference by a number of individuals at any one location. With increased communication capabilities, videoconferences that provide an image of the conferees with the audio are becoming more wide spread. Many global companies have conference rooms equipped with video equipment to support and encourage videoconferencing. Additionally, it is possible to communicate over the internet, as demonstrated by the proliferation of "chat rooms" dedicated to particular subjects.

SUMMARY OF INVENTION

This invention relates to a system and a method for simultaneous monitoring of multiple remote conferences with a capability to alert the user to the occurrence of a pertinent discussion.

With the availability of enhanced communication and data handling systems, it is possible for an individual, or a group, to multitask by simultaneously receiving a plurality of data streams at a central location. The individual, or group, can monitor the data streams and, when needed, insert themselves into the conference to provide analysis and decision making capabilities. Such situations often are encountered in the control rooms of process plants, where personnel monitor displays of operating data and respond to the data by adjusting the plant controls to optimize plant production. By centralizing control, operator efficiency and plant productivity are increased while costs are reduced.

Similarly, with the advent of Computer Telephony Integration (CTI), and conferencing utilities, it is possible for an individual to multitask by participating in multiple conferences via two line telephone lines or multiple video and/or audio broadcasts. While the video data may be monitored on a plurality of screens or upon a single split screen, it is difficult for one individual, or even a group, to follow the multiple conversations. Indeed, it is well known that human hearing capability tends to filter out one conversation from several other conversations. Accordingly, to facilitate multitasking with regard to conferences, it would be desirable to provide a capability to monitor the multiple inputs and draw attention of the user to a particular conference when a topic of interest to the user arises.

The present invention contemplates a system for monitoring multiple simultaneous conferences that includes a device adapted to simultaneously receive multiple information streams from a plurality of remote conference locations. The system also includes a device connected to the receiver device for converting each of the information streams into a predetermined format. The system further includes a device connected to the conversion device for simultaneously displaying each of the formatted data streams and a recognition device connected to the conversion device that is operative to simultaneously scan each of the formatted data streams for at least one predetermined indicia. The recognition device is further operative to generate a signal upon determining that the predetermined indicia is present in at least one of the data streams.

In the preferred embodiment, the recognition device also is connected to the display device and the signal generated by the recognition device is a visual indicia that is displayed upon the display device. Additionally, in the preferred embodiment, the device for converting each of the information streams into a predetermined format includes a speech to text conversion device that converts each stream of audio information into text. The text is then displayed upon the display device. Accordingly, for the preferred embodiment, the indicia includes a list of predetermined words and/or phrases with the recognition device being operable to compare the text to the list and to generate the signal upon detecting the presence of one of the predetermined words or phrases within the text.

Also, in the preferred embodiment, the display device includes a split screen divided into a plurality of screen portions with each of the screen portions being operative to display an associated one of the formatted data streams. However, the display device may alternately include a plurality of screens with each of the screens being operative to display an associated one of the formatted data streams.

The present invention also contemplates a method for monitoring multiple simultaneous conferences that includes providing a device adapted to simultaneously receive information from multiple conferences and to format the received information into a data stream that is supplied to a display device. The display device is capable of displaying all of the formatted information streams simultaneously. Information is received from multiple conferences simultaneously and displayed upon the display device while each of the formatted data streams is compared to at least one predetermined indicia. Upon determining that a predetermined indicia is present within one of the data streams, a signal is generated. In the preferred embodiment, the generated signal is a visual signal that identifies the data stream that contains the predetermined indicia.

Various objects and advantages of this invention will become apparent to those skilled in the art from the following detailed description of the preferred embodiment, when read in light of the accompanying drawings.

DETAILED DESCRIPTION

Figure 1:
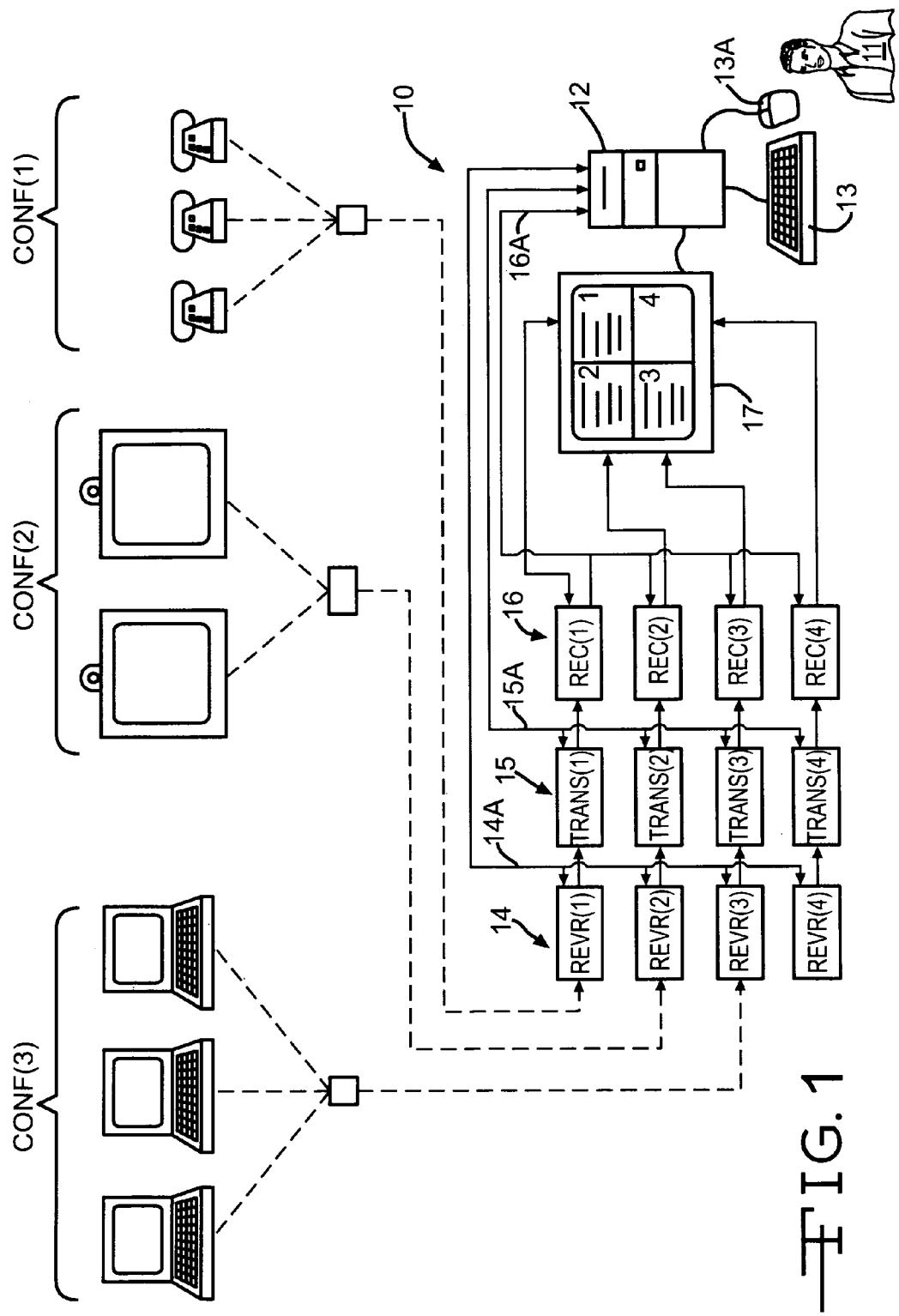
FIG. 1 is a schematic diagram of a system for simultaneous monitoring of multiple conferences that is in accordance with the present invention.

Referring now to the drawings, there is illustrated in FIG. 1 a schematic diagram that illustrates a system 10 that is in accordance with the present invention. The present invention utilizes the enhanced capacity and speed of personal computers, that includes the capability to simultaneously run multiple programs, and increased sophistication of communication systems. The present invention contemplates that a user 11 can establish multiple communication links with a plurality, N, of simultaneous conferences with a personal computer 12. The user can control the computer with a keyboard 13 and/or mouse (not shown). For the system shown in FIG. 1, communications can be established with up to four conferences, with communication being shown with three conferences that are labeled CONF(1) through CONF(3) in the figure. Such conferences may configured with any conventional distance communication method. For instance, the conferences may be audio, video, streaming data or a combination of the different types. Thus, CONF(1) in FIG. 1 represents a teleconference connecting three remote locations with speaker phones. CONF(2), represents a video conference between two remote locations while CONF (3) represents a conference on the internet between three personal computers. While three different types of remote conferences are illustrated in FIG. 1, it will be appreciated that all the conferences may be of the same type, or of a type not shown. The system 10 allows the user 11 to join and monitor all three of the conferences shown.

The system 10 includes a plurality of receivers 14 that receive transmissions from the conferences with one of the receivers 14 connected to one of the conferences. The connections between the receivers 14 and the conferences are shown in FIG. 1 by dashed lines, which represent conventional communication links. For example, the personal computers shown for CONF(3) can be connected to each other and the system 10 through the internet. Each of the receivers 14 is controlled by the user's personal computer 12 with the control illustrated in FIG. 1 by the control line 14A connecting the computer 12 to the receivers 14. The single control line 14A shown represents four control channels, with each channel associated with one of the receivers 14. The system 10 also includes a translation device 15 that is associated with and connected to each of the receivers 14. The translation devices 15 are operative to convert the received information into a format for monitoring. In the preferred embodiment, the translation device 15 is a speech to text transcription device that utilizes available software to convert an audio feed into a real-time text message. As with the receivers 14, the translation devices 15 also are controlled by the personal computer 12 through a control line 15A. Each of the translation devices 15 is connected to an associated recognition device 16. In the preferred embodiment, the recognition device scans the text for key words and/or phrases stored in the personal computer 12 and supplied by the control line 16A shown in FIG. 1. When a key term is recognized within one of the transcribed texts, an alert signal is supplied back to the personal computer 12 from the recognition devices 16 through the recognition device control line 16A. While shown in FIG. 1 as separate hardware devices or modules for ease of understanding, it will be appreciated that each of the receiving, translating and recognition devices also can be software modules or applications running within the personal computer 12 (not shown).

The recognition devices 16 are connected to a display 17, which in the preferred embodiment includes a split screen for simultaneous display of all of the transcribed texts. Thus, the text is fed from the recognition devices 16 to an associated segment of the split screen display 17. Alternately, the text is fed to a plurality of co-located screen displays with a display associated with each of the recognition devices 16. In the preferred embodiment, the text is scrolled across the screen and any recognized key words and/or phrases are indicated visually to alert the user 11 of their presence. Such alerts can consist of highlighting or flashing the text. All of the text messages are continually monitored, allowing the user 11 to follow up to four conferences simultaneously. Upon receiving an alert signal, the user 11 can focus on the particular conference. The system also contemplates that the user 11 has an option to assume an active role by entering into any one of the conferences. Thus, multitasking can be applied to simultaneously occurring conferences to significantly increase the productivity of the user 11.

While the system 10 has been illustrated in FIG. 1 and described above with the capability to simultaneously monitor up to four conferences, it will be appreciated that the invention also can be practiced with a system having a capability to simultaneously monitor more or less conferences (not shown). Also, while the preferred embodiment of the system 10 is controlled by means of a personal computer, it will be appreciated that the system also may be controlled by other devices.

Figure 2:
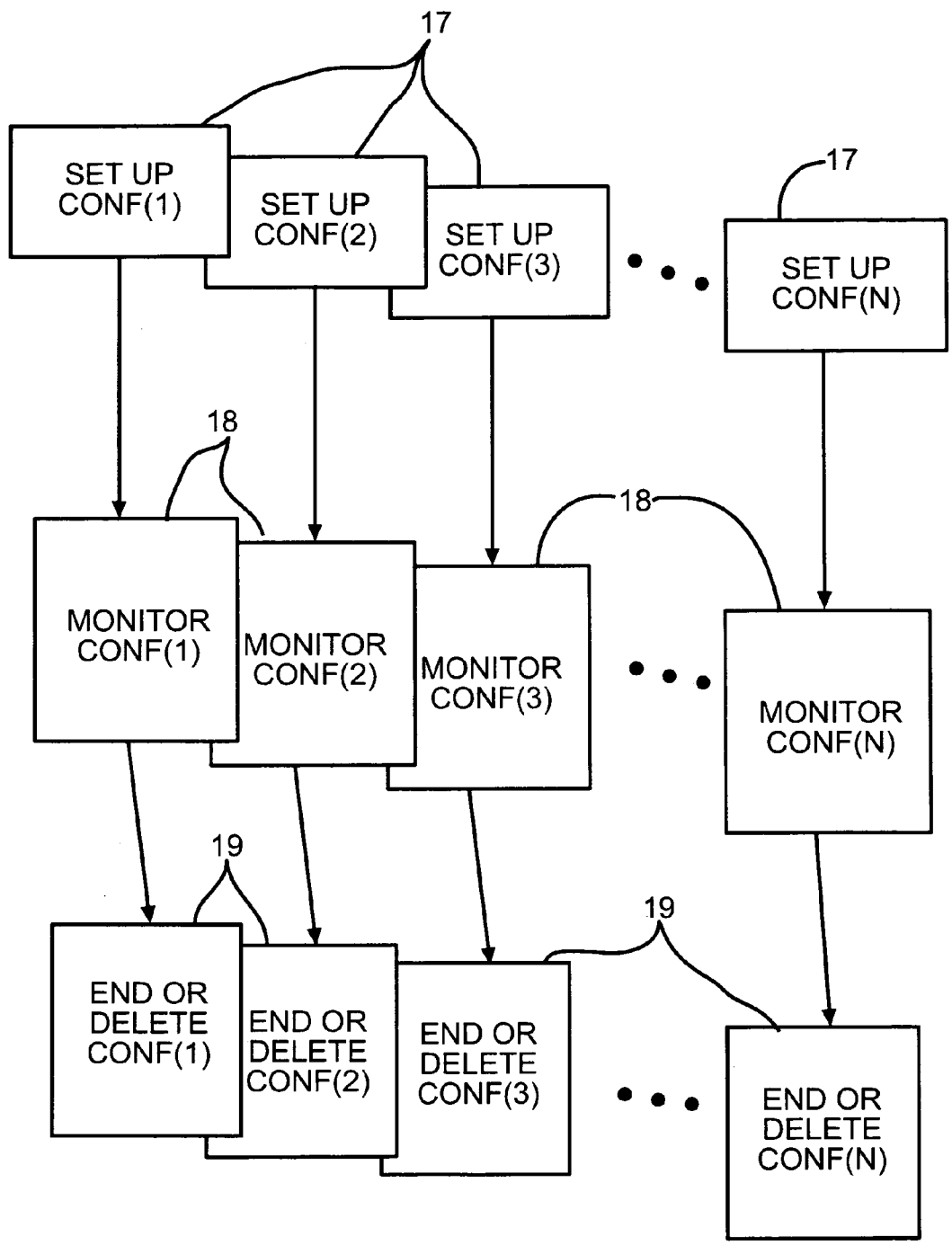
FIG. 2 is a schematic diagram of a method for a simultaneous monitoring of multiple conferences that utilizes the system shown in FIG. 1.

The method of operation of the system 10 is schematically illustrated in FIG. 2. In each of the blocks labeled 17 in FIG. 3, the user provides the necessary data to establish his participation in one of the conferences. As will be explained below, the connection can be established at the time that the data is provided or connection may be delayed until a scheduled start time. As shown in FIG. 2, the user establishes participation in conferences one through N, where N is maximum number of conferences that can be monitored. Thus, N is limited by the capacity of the equipment.

After providing the input data, the present invention establishes a communication channel with each conference site and monitors the conference as shown by the blocks labeled 18 in FIG. 2. In the preferred embodiment, the audio of each conference is transcribed and displayed simultaneously for the user. Thus, up to N monitoring operations can be taking place simultaneously. Again, in the preferred embodiment, all of the transcriptions are simultaneously displayed upon a single split monitor screen having N sections. Alternately, N monitors may be arranged together with each of the monitors displaying one of the transcripts. Also in the preferred embodiment, the transcripts are compared to stored key words that trigger a signal to alert the user that the conference is discussing a matter of interest to the user.

Finally, as shown in the blocks labeled 19 in FIG. 2, any one of the monitoring operations ceases upon the conference ending or upon the user terminating the operation prior to the end of the conference.

Figure 3:
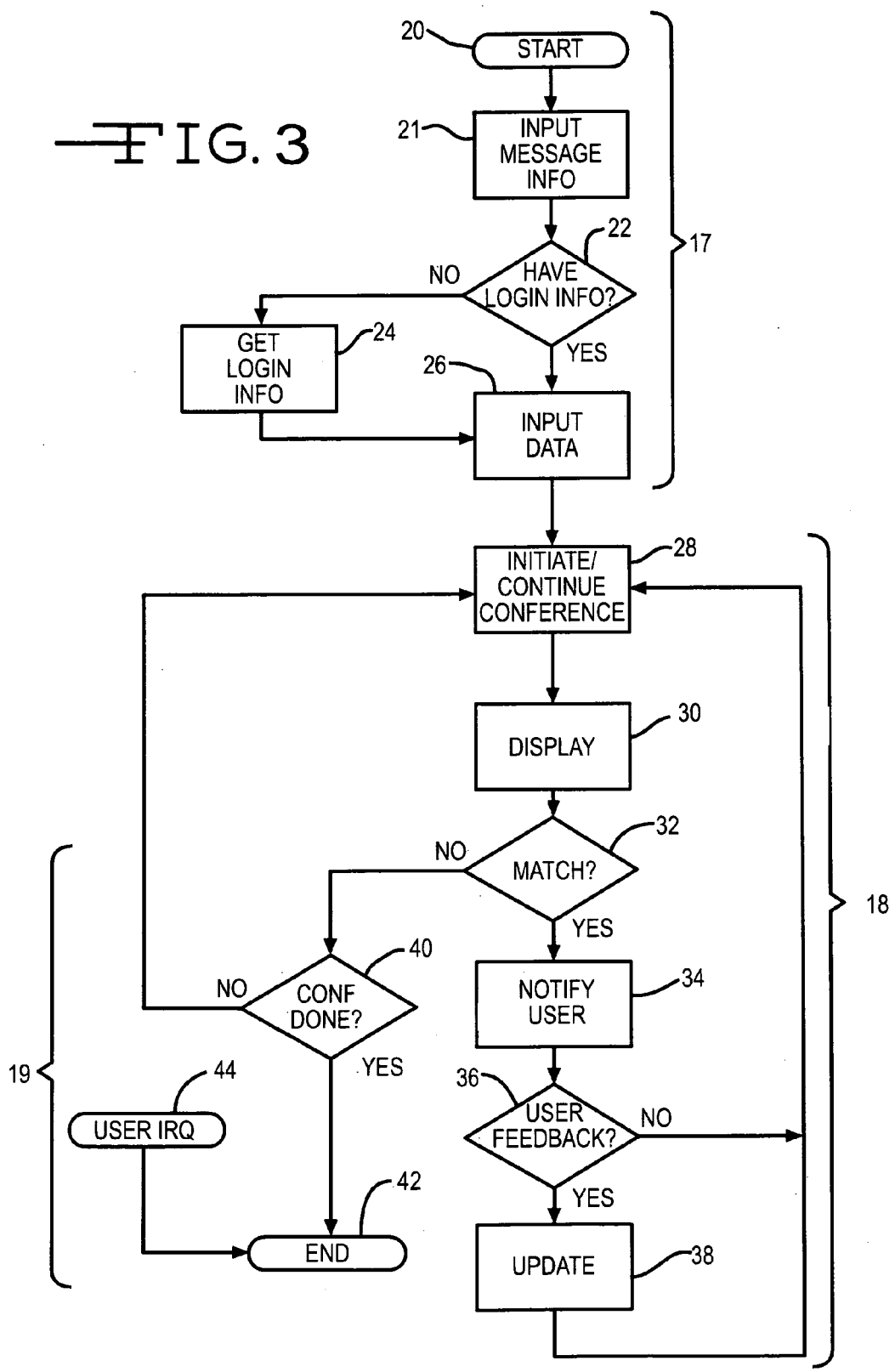
FIG. 3 is a flow chart illustrating the operation of a portion of the method shown in FIG. 2.

Referring now to FIG. 3, there is shown a flow chart that illustrates the preferred embodiment of a subroutine for the monitoring of one of the conferences that includes the operations shown in blocks 17, 18 and 19 in FIG. 2. The portion of the flow chart in FIG. 3 that corresponds to a particular one of the blocks in FIG. 2 is enclosed by a bracket that is labeled with the numerical designator for the corresponding block in FIG. 2. As described above, the equipment has the capacity to concurrently run a plurality of the subroutines shown in FIG. 3 to allow simultaneously monitoring of multiple conferences. Thus, while one subroutine is shown, it is representative of multiple such subroutines. The subroutine enters through block 20 and proceeds to functional block 21 where the user inputs conference identification information. Such information could be as simple as the title of the conference, or the conference title and the starting time. The subroutine then advances to decision block 22 where it is determined whether login information is available for joining the conference. Such login information can include the telephone number of other party, security data such as passwords for establishing the communication link and billing information for the communication system charges. The login information may already be stored on the hard drive of the user's personal computer, as would be the case for frequent or regular conferences among members of the same organization, such a weekly staff meeting. If the login information is not available, the subroutine transfers to functional block 24 where the information is requested from the user by the subroutine, such as by pinging the user for the missing information. Alternately, the information could be obtained from storage on the computer hard drive or by pinging another conference computer. Upon receiving the information, the subroutine advances to functional block 26. If the login information is available, the subroutine advances to functional block 26.

In functional block 26, the user can input operating data needed for the monitoring operation of the subroutine. In the preferred embodiment, the user inputs key words and/or phrases that trigger a signal to alert the user that a matter of interest to the user is under discussion at the conference. Alternately, a list of key words and/or phrases could be stored in the personal computer. It is contemplated that an additional label, such as "urgent" can be applied to selected key words to classify or prioritize the need for user attention. The user also can indicate a desired notification mode that will be used for signaling the user. In the preferred embodiment a visual signal would be used to notify the user that a key word or phase has been detected. For example, when one of the key words occurs, the subroutine could cause the word in the transcript to flash in the display, or the entire split screen could flash to call attention to a particular portion of the monitor. Similarly, if multiple monitors are used, the entire screen of the monitor could flash to draw attention. Alternately, the user could arrange for the subroutine to page him, if he is expected to be absent from his desk, or to page an assistant. Another option would be to store the portion of the transcript that contains the key word for later review. While the notification mode data is shown as being input at the beginning of the subroutine, the invention also contemplates that the notification mode data can be changed at any time that the subroutine is running (not shown). Thus, should the user be unexpectedly called away from his work stations, he can shift the mode of notification accordingly.

It will be appreciated that, while the preferred embodiment compares key words to a transcript, the invention also can be practiced by comparing a stored graphic or symbol to a video image from a videoconference or a PowerPoint slide in a webcast conference. Similarly, the trigger could be a section heading to alert the user to the start of a particular section or subsection in a conference that is of interest to the user when the user is not interested in the rest of the same conference. This feature is especially advantageous to allow the user to monitor simultaneous conference proceedings.

In functional block 28, the conference is initiated upon initial entry into the block, or continued upon subsequent entry into the block. Upon first entering functional block 28, the login data obtained from memory or provided in functional block 26 is utilized to establish a communications link with the conference and begin monitoring data. Upon initially joining the conference, the invention contemplates that the name of the user would be announced to the other conferees so that they would be aware that he has joined the conference. In the preferred embodiment, the audio is converted to a transcript by a conventional available speech to text conversion program, such as, for example, ViaVoice™, which is available from IBM.

The transcript is displayed upon one of a plurality of monitor screens, or upon a portion of a single monitor split screen, in functional block 30. It is contemplated that the displayed real time transcript would follow the basic format utilized by various instant messaging implementations, with the text being scrolled across the screen and the present speaker identified by name or user ID. Conventional voice recognition programs can be included to identify the speaker. Upon subsequent reentry of block 28, the transcription continues.

The subroutine then continues to decision block 32 where a conventional search utility is utilized to locate any key words and/or phrases that may be present in the transcript. Such search utilities are usually included under "find" within the edit pull down menu of word processing programs, such as, for example, Microsoft Word™. Upon detecting a match with a key word or phase, the subroutine transfers to functional block 34 where the user is notified of the match by the method selected in functional block 24. It is also contemplated that the user can indicate alternate notifications. Thus, if the user does not respond to a flashing indicator or other visual signal, a Personal Communication System (PCS) call, such as a cell phone call, and/or a text page, such as a Sprint Messaging System (SMS) message, to the user can be generated, in case the user has left his work area. Alternately, an urgent e-mail or page can be directed to a designated colleague or direct report for assistance if the user is unable to attend to an item that is marked urgent. The subroutine then advances to decision block 36.

In decision block 36, the user is given an opportunity to provide feedback. If the user elects to provide feedback, the subroutine transfers to functional block 38 where the user may modify the media conversion software used in functional block 28 and/or change the match criteria input in functional block 24. The subroutine then returns to functional block 28 and continues to monitor the conference. Additionally, the invention also contemplates that functional block 38 can include the option for the user to become a participant in the conference. Thus, the user can abandon passive monitoring of the conference for an active role. If the user elects to join the conference, options would be provided for selecting a link to establish communication from the user to the selected conference (not shown). If, in decision block 36, the user does not desire to provide feedback or join the conference, the subroutine returns directly to functional block 28 and continues to monitor the conference.

The lower left portion of FIG. 3 concerns the End or Delete Conference shown in the blocks labeled 19 in FIG. 2. Returning to decision block 32, if the subroutine does not find a match, the subroutine checks to determine whether the conference has ended. The end of the conference may be detected by termination of the conference feed from the other remote locations, or non-receipt of any audio and/or video signal for greater than a predetermined time period, such as, for example, five minutes. Upon determining that the conference has ended, the subroutine transfers to the end block 42 and disconnects from the conference. If the conference has not ended, the subroutine returns directly to functional block 28 and continues to monitor the conference.

While the conference done decision block 40 is shown as being entered upon a match not being found in decision block 32, it will be appreciated that this positioning of the decision block 40 is exemplary and that the invention also may be practiced with the block 40 located in other positions within the flow chart. Thus, for example, decision block 40 also could be placed between functional block 30 and decision block 32. With the later placement, the subroutine would check for the conference having ended during every iteration of the subroutine, as compared to checking only during iterations when no match is found in decision block 32, as shown in FIG. 3. Similarly, decision block 40 also could be placed below decision block 32, in which case the end of conference would be checked only during iterations of the subroutine during which a match is found in decision block 32. Alternately, the invention also may be practiced with the termination functions included in both paths issuing from decision block 32.

Alternately, the invention contemplates that the subroutine can be exited when a User Interrupt Request (IRQ) command is input by the user through the keyboard or a pull down menu at any time to indicate that the user wants to discontinue monitoring the selected conference. Hence, the initiation of a User IRQ is represented in FIG. 3 by a free standing entry block labeled 44. Upon recognizing the input of a User IRQ, the subroutine immediately interrupts the monitoring of the conference and transfers to the end block 42 to disconnect from the conference. After disconnecting, an optional disconnect message can be forwarded to the conference to inform the conferees that the user is no longer participating.

Figure 4:
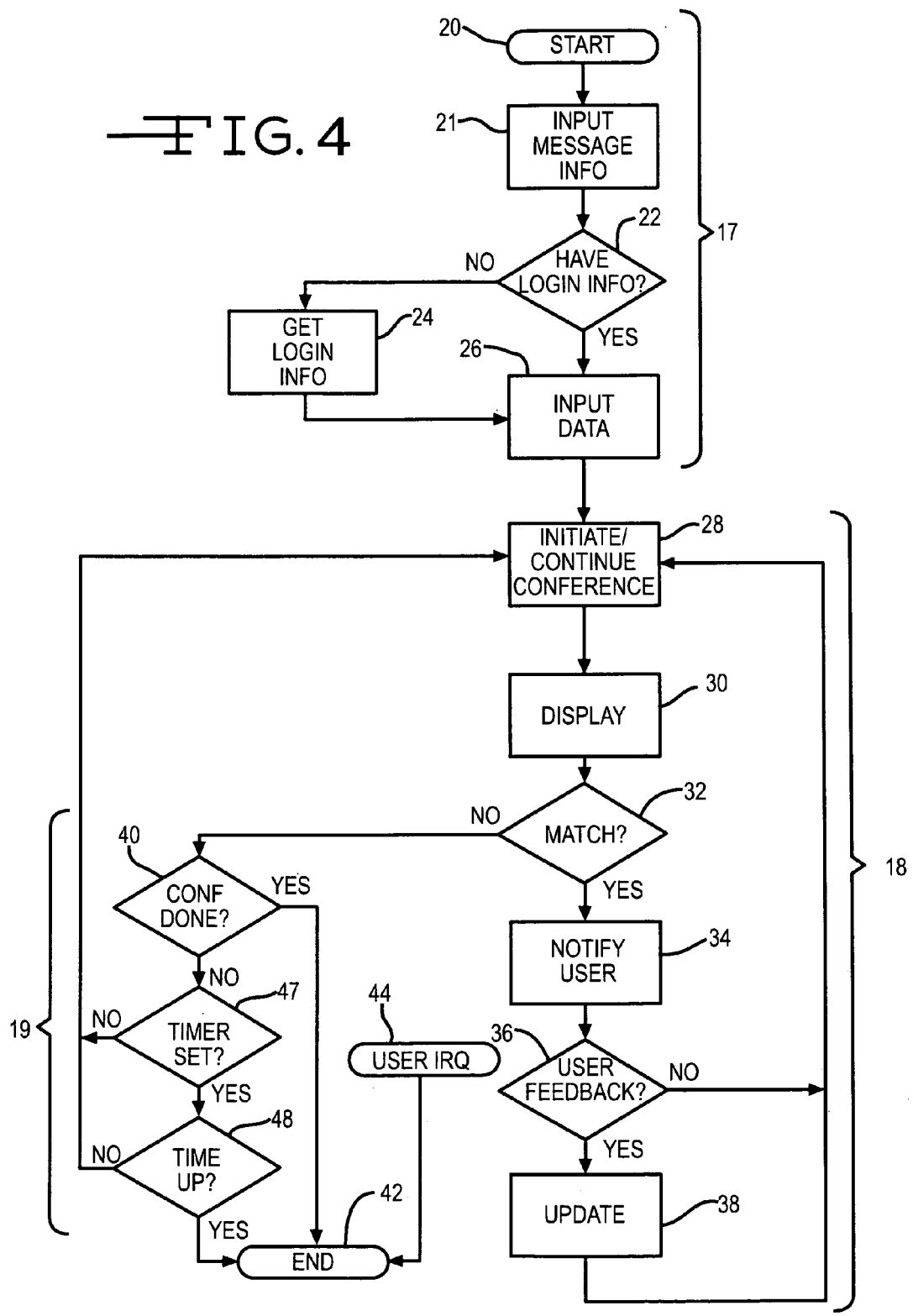
FIG. 4 is an alternate embodiment of the flow chart shown in FIG. 3.

The invention also contemplates an alternate embodiment that includes the use of a timer with termination occurring after a predetermined time period has passed, as illustrated by the flow chart shown in FIG. 4. Components shown in FIG. 4 that are similar to FIG. 3 have the same numerical designators. The alternate embodiment includes a modified data input functional block 46 that replaces the block labeled 26 near the top of FIG. 3. The modified input block 46 includes a connection timer with the capability to receive a conference duration time from the user 11 via his personal computer 12. Additionally, a timer set decision block 47 and a time up decision block 48 have been added to the lower left portion of the flow chart with the timer set decision block 47 located between the conference done decision block 40 and the initiate/continue conference functional block 28. Upon reaching the timer set decision block 47, the algorithm determines if the conference duration timer was set in functional block 46. If the timer was not set, the subroutine returns to the initiate/continue conference functional block 28 and continues to monitor the conference as described above. If the timer was set, the subroutine transfers to time up decision block 48 where the subroutine determines whether the conference duration time has lapsed. If the duration time has not lapsed, the subroutine returns directly to functional block 28 and continues to monitor the conference. Upon determining that the conference duration time has lapsed, the subroutine transfers to the end block 42 and disconnects from the conference. As before, an optional disconnect message can be forwarded to the conference to inform the other conferees that the user is no longer participating.

The subroutines shown in FIGS. 3 and 4 apply to one of the N conferences shown in FIG. 2. The invention contemplates that N subroutines will be placed into operation and will be simultaneously monitoring N conferences. All N conferences may be initiated at the same time, or additional conferences may be added at any time just as active conferences may be deleted at any time. Adding an additional conference would merely require beginning at start block 20 while the concurrently running subroutines continue to run.

Figure 5:
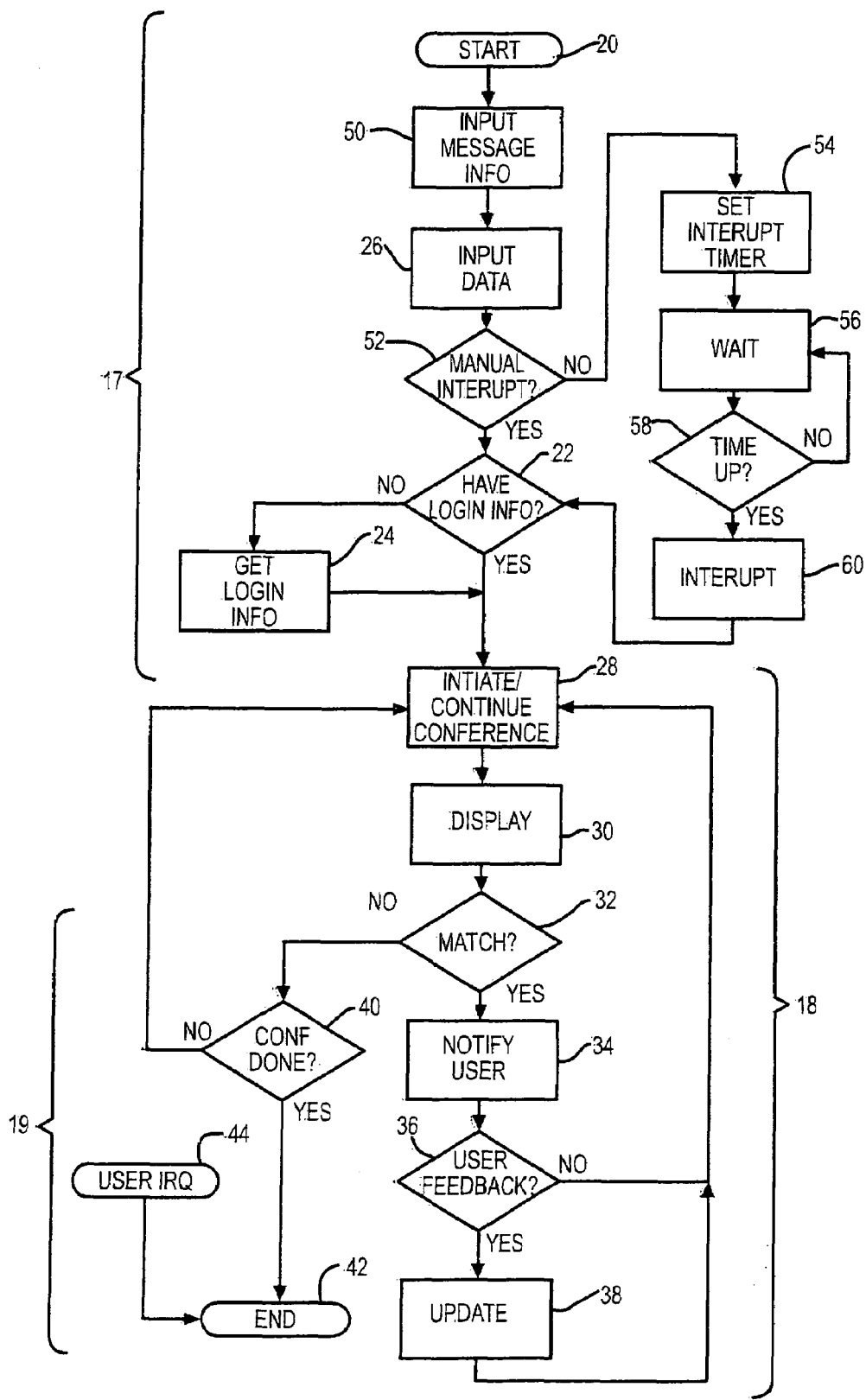
FIG. 5 is a flow chart illustrating an alternate embodiment of the initiation portion of the method shown in FIG. 3.

The invention further contemplates an alternate embodiment that includes delaying entry into a conference to a predetermined time. The alternate embodiment is illustrated by the flow chart shown in FIG. 5. Blocks shown in FIG. 5 that are similar to blocks shown in FIG. 3 have the same numerical identifiers. As before, the subroutine is entered through block 20 and proceeds to functional block 50 where the user inputs meeting information as described above, but also can indicate a future time and date for joining a conference. The ability for joining in the future allows monitoring of a conference in another time zone that may take place outside of the user's normal business hours. If no future time and date is supplied in block 50, it indicates that the conference is to be joined in real time, which will be referred to in the following as a "manual interrupt". Similarly, joining a conference in the future will be referred to in the following as a "delayed interrupt".

The subroutine then advances to functional block 26, which has been relocated from the position shown in FIGS. 3 and 4 to occur earlier in the subroutine in order to accommodate a delayed entry into a conference, since the user may not be available to provide the data when the delayed entry occurs. In functional block 26, the user can input operating data needed for monitoring the conference, such as key words and/or phrases, as described above. The subroutine then advances to decision block 52 where it is determined whether or not the conference request includes a manual interrupt. If a manual interrupt is present, the subroutine advances to decision block 22 and then proceeds as described above.

If, in decision block 52, there is no manual interrupt present, the new conference is intended to be a delayed interrupt. Accordingly, the subroutine advances to functional block 54 where an interrupt timer is set to expire at the time and date specified in functional block 50. The subroutine then continues to functional block 56 where it waits for a predetermined time period, such as, for example, one minute. Upon the predetermined time period elapsing, the subroutine advances to decision block 58 where the interrupt timer is checked to determine if the specified time and date has been reached. If the time and date has not been reached, the subroutine returns to functional block 56 and waits for another predetermined time period before advancing again to decision block 58. When the time and date is been reached in decision block 58, the subroutine advances to an interrupt block 60. This is because the invention contemplates that the block 60 for the alternate embodiment shown in FIG. 5 includes an application based interrupt signal in the personal computer to make the intended application window active. Thus, the invention would allow automatic integration into an ongoing conference. After activating the application window, the subroutine advances to decision block 22 to check for login information and then continues as before. When the user is not present due to a delayed entry, the information would be obtained from storage on the computer hard drive or by pinging another conference computer. While the preferred embodiment has been described as delaying joining a conference to a specified time and day, it is also possible to join to join a conference at a specified time on the same day. Thus, the user can set up the conferencing subroutine to join a conference while he is attending another meeting.

The present invention allows the user to view real-time transcripts of simultaneous conferences. The present invention also allows the simultaneously produced real-time transcripts to be sensitive to pre-defined words or other material while allowing a variety of actions to be taken in response to the pre-defined material being detected. Such actions can include making the tagged conference an active window on a personal computer or laptop.

While the preferred embodiment has been illustrated and described as providing a capability to monitor simultaneously occurring conferences, it will be appreciated that the invention also contemplates that the user may insert himself into one of the conferences at any time. That is, the invention further contemplates that two way communication can be established between the user and the conferees of any one of the monitored conferences (not shown). Thus, upon being alerted that a key word or phrase has been identified, the user can become an active participant.

The principle and mode of operation of this invention have been explained and illustrated in its preferred embodiment.

However, it must be understood that this invention may be practiced otherwise than as specifically explained and illustrated without departing from its spirit or scope. For example, the delayed entry feature shown in FIG. 5 also can be included in the flow chart shown in FIG. 3 while the timed exit illustrated in FIG. 4 also can be included in the flow chart shown in FIG. 5.

What is claimed is:

1. A system for monitoring multiple simultaneous conferences comprising:
   a plurality of receivers with each of said receivers operative to simultaneously receive an information stream from a corresponding one of a plurality of separate remote conference locations;
   a device connected to each of said plurality of receivers, said device operative to convert each of said information streams into corresponding streams of text;
   a display connected to said conversion device for simultaneously displaying each of said streams of text;
   an input device operable by a system user to enter at least one key word before initiating the conferences; and
   a recognition device connected to said conversion device, said recognition device operative to simultaneously scan each of said streams of text for said at least one key word, said recognition device further operative to generate a signal only upon determining that said key word is present in at least one of said data streams of text.

2. The system according to claim 1 wherein said recognition device also is connected to said display device and further wherein said signal generated by said recognition device is a visual indicia displayed upon said display device to call attention to said stream of text that contains said key word.

3. The system according to claim 2 wherein at least one of said information streams includes audio information and further wherein said device for converting each of said information streams into a stream of text includes a speech to text conversion device that is operative to convert said audio information into one of said streams of text that is displayed upon said display device.

4. The system according to claim 3 wherein said plurality of receivers, converting device and recognition device are included within a personal computer and further wherein said display device is a monitor connected to said personal computer.

5. The system according to claim 4 wherein said plurality of receivers, converting device and recognition device are implemented by software applications running within said personal computer.

6. The system according to claim 4 wherein said plurality of receivers, converting device and recognition device are implemented by software modules included within said personal computer.

7. The system according to claim 3 wherein said recognition device also is operable to compare said streams of text to a predetermined phrase, said recognition device being further operable to generate said signal upon detecting said predetermined phrase in at least one of said streams of text.

8. The system according to claim 3 wherein at least one of said information streams includes visual information and further wherein said device for converting each of said information streams into a predetermined format is operative to display said stream of video information upon said display device.

9. The system according to claim 3 wherein said display device includes a split screen divided into a plurality of screen portions, each of said screen portions being operative to display an associated one of said streams of text.

10. The system according to claim 3 wherein said display device includes a plurality of screens, each of said screens being operative to display an associated one of said streams of text.

11. The system according to claim 3 further including a device that is selectively operative, upon a said key word being present in at least one of said streams of text, to initiate two way communication with at least one of said remote conferences whereby a user of the system may actively participate in the remote conference.

12. A method for monitoring multiple simultaneous conferences comprising the steps of:
   (a) providing a device having a plurality of receivers, each of which is operative to simultaneously receive an information stream from one of a corresponding plurality of remote conference locations, the device being operative to convert the information streams into a plurality of streams of text that are supplied to a display device, the display device being capable of displaying all of the streams of text simultaneously;
   (b) inputting a search word into the device;
   (c) storing the search word in the device;
   (d) receiving information streams from multiple conferences simultaneously and converting the information into corresponding streams of text;
   (e) displaying the streams of text upon the display device;
   (f) comparing each of the streams of text to the search word as the text is displayed in step (e); and
   (g) generating a signal upon recognizing that the search word is present in one of the streams of text.

13. The method according to claim 12 wherein, during step (g), the signal is directed toward a user and further wherein the signal directs the user to the displayed stream of text that contains the recognized search word.

14. The method according to claim 12 wherein the information stream received in step (d) from at least one of the conferences is audio information and further wherein the device provided in step (a) is operative to convert the audio information into text.

15. The system according to claim 14 wherein the display device includes a split screen divided into a plurality of screen portions, each of the screen portions being operative to display an associated one of the streams of text.

16. The method according to claim 15 wherein the device provided in step (a) is a personal computer and further wherein the conversion in step (d), the comparison in step (f) and the recognition in step (g) are implemented by software applications running within the personal computer.

17. The method according to claim 16 wherein the display device is a monitor connected to the personal computer.

18. The method according to claim 17 further including the capability to selectively delaying connection to receive information from at least one remote conference until a preselected date and time.

19. The method according to claim 17 further including, subsequent to step (d), the step of initiating a two way conversation with at least one of the remote conferences whereby a user of the device provided in step (a) may actively participate in the remote conference.

20. The method according to claim 15 wherein the device provided in step (a) is a personal computer and further wherein the conversion in step (d), the comparison in step (f) and the recognition in step (g) are implemented by software modules running within the personal computer.

21. The system according to claim 14 wherein the display device includes a plurality of screens, each of the screens being operative to display an associated one of the streams of text.

* * * * *